(12) United States Patent
Chen et al.

(10) Patent No.: US 9,302,151 B2
(45) Date of Patent: Apr. 5, 2016

(54) BOWED STRINGED INSTRUMENT BOWING EXERCISE APPARATUS AND MANUFACTURING METHOD THEREOF

(71) Applicant: Yu-Hua Chen, Tainan (TW)

(72) Inventors: Yu-Hua Chen, Tainan (TW); Cheng-Hsiung Lin, Miaoli County (TW); Yung-Yu Lin, Miaoli County (TW); Kae Han, Hsinchu (TW)

(73) Assignee: Yu-Hua Chen, Tainan (TW)

( * ) Notice: Subject to any disclaimer, the term of this patent is extended or adjusted under 35 U.S.C. 154(b) by 0 days.

(21) Appl. No.: 14/542,811

(22) Filed: Nov. 17, 2014

(65) Prior Publication Data

US 2015/0190674 A1  Jul. 9, 2015

(30) Foreign Application Priority Data

Jan. 9, 2014 (TW) .............................. 103100780 A
May 16, 2014 (TW) .............................. 103117359 A

(51) Int. Cl.
*A63B 23/16* (2006.01)
*A63B 21/00* (2006.01)

(52) U.S. Cl.
CPC ........... *A63B 23/16* (2013.01); *A63B 21/00189* (2013.01)

(58) Field of Classification Search
CPC .......... G09B 15/06; G09B 15/00; G09B 9/00; G09B 15/003; G10D 3/16; G10D 1/02
USPC .............................................. 84/465, 280–283
See application file for complete search history.

(56) References Cited

U.S. PATENT DOCUMENTS 1,275,202 A * 8/1918 Becker ...................... G10D 1/02
  84/274
5,670,727 A * 9/1997 Xiao ...................... G09B 15/06
  84/283

* cited by examiner

*Primary Examiner* — Kimberly Lockett
(74) *Attorney, Agent, or Firm* — Rosenberg, Klein & Lee

(57) ABSTRACT

A bowed stringed instrument bowing exercise apparatus includes a base having at least one connecting portion, a cross bar having a first end and a second end opposite to each other and at least one connecting portion between the first and second ends, and the cross bar being installed at the connecting portion through the first end, and a track rod having an end portion provided for fixing or slidably connecting the connecting portion. When the track rod is operated, an operator experience and learn how to play the bowing motion steadily by hand to train the operator's coordination and control on how to bow strings to produce different tones.

17 Claims, 15 Drawing Sheets

BOWED STRINGED INSTRUMENT BOWING EXERCISE APPARATUS AND MANUFACTURING METHOD THEREOF

BACKGROUND OF THE INVENTION

1. Fields of the Invention

The present invention relates to a bowed stringed instrument bowing exercise apparatus, and more particularly, to a bowing exercise apparatus for string instruments.

2. Descriptions of Related Art

Bowed stringed instrument is one of the favorite musical instruments with the features of beautiful tone and excellent emotional expression, and thus it is an ideal solo musical instrument. In the past few centuries, bowed stringed instrument has been welcome by musicians and audience. As the level of tone determines the size, thickness and tension of a string, a shorter, finer and tenser string produces a higher tone. Each string is extended from the bottom of the string to an end of a fingerboard across a bridge and fixed by a nut. In the principle of making sounds, the strings are bowed or plucked, so that the air in the bowed stringed instrument body is vibrated to produce sounds through resonance.

When an operator bows the strings to play a bowed stringed instrument, the operator's hands often shake such that the strings are bowed in an arc curve. If it is necessary to bow the strings in a straight line or in any other path steadily without shaking, then the operator has to practice bowing while imagining the bowing track. The operator needs to coordinate muscles at different parts of the body stably and flexibly in order to control bowing the strings in an ideal track and produce beautiful sounds.

In general, people practice and learn how to play a bowed stringed instrument by using an aid installed at the position of bowing the bowed stringed instrument. As disclosed in Taiwan Pat. No. 585337 entitled "Bowing aid of cello/bowed stringed instrument", the operation of bowing the strings is limited to a linear motion, but such arrangement causes inconvenience for changing the strings. As disclosed in Taiwan Pat. Publication No. 200529172 entitled "bowed stringed instrument bowing auxiliary device", Taiwan Utility Model No. M433618 entitled "Musical instrument exercise auxiliary device" and Taiwan Utility Model No. M275504 entitled "Bowed stringed instrument bowing exercise reminder", a barrier wall is provided for a performer to bow the strings of a bowed stringed instrument, the bowed stringed instrument bow is moving within a range from a bridge to a fingerboard and perpendicular to the strings. However, the bowed stringed instrument bow still has up-and-down shaking spaces, so that a stable bowing motion cannot be practiced easily.

In addition, the position of bowing the strings of a bowed stringed instrument is fixed after the auxiliary equipment is set at the bowed stringed instrument, and the front and rear bowing positions cannot be changed flexibly, and the bowing exercise for different tone positions cannot be achieved.

Therefore, it is an important and urgent subject to improve performers' capability of keeping their hands stable in a bowing operation while playing a straight bow or changing strings in a performance, and allow the performers to practice the bowing exercise for different tone positions.

In view of the aforementioned problems, the inventor of the present invention based on years of experience in the related industry to conduct extensive researches and experiments, and finally designed and developed a bowed stringed instrument bowing exercise apparatus in hope of overcoming the aforementioned problems of the prior art.

SUMMARY OF THE INVENTION

The present invention relates to a bowed stringed instrument bowing exercise apparatus and comprises at least one limit structure; and a track rod with an end installed to the at least one limit structure, such that the track rod forms a bowing track.

In an embodiment, the bowed stringed instrument bowing exercise apparatus further comprises a first fixing wall and a second fixing wall, and the limit structure is formed on the first fixing wall and the second fixing wall.

In an embodiment, the bowed stringed instrument bowing exercise apparatus further comprises a first fixing wall and a second fixing wall, and a cross bar is installed between the first fixing wall and a second fixing wall, and the limit structure forms the cross bar.

In an embodiment, the cross bar is coupled to the first fixing wall and the second fixing wall through a pivotal connection, a screw connection, or a magnetic suction, so that the limit structure is rotated to and positioned at an arbitrary angle.

In an embodiment, the bowed stringed instrument bowing exercise apparatus further comprises: a base, having at least one connecting portion; and a cross bar, having a first end and a second end disposed opposite to each other, and at least one connecting portion disposed between the first end and the second end, and the cross bar is installed to the connection portion through the first end, and the connecting portion forms the limit structure.

In an embodiment, the base further comprises a first fixing wall and a second fixing wall, and the connecting portion is disposed on the first fixing wall and the second fixing wall.

In an embodiment, the base further comprises a positioning element or a plug slot.

In an embodiment, the positioning element is a sucker or a binder with a Velcro tape.

In an embodiment, the first end and the second end of the cross bar are coupled to the connecting portion through a pivotal connection, a screw connection or a magnetic suction, so that the connecting portion is rotated to and position at an arbitrary angle.

In an embodiment, the connecting portion is a slide slot slidably formed along the lengthwise direction of the cross bar.

In an embodiment, the limit structure is a hole, and the end portion of the track rod is a projection provided for plugging into the hole; or the limit structure is a projection, and the end portion of the track rod is a hole provided for plugging the projection therein.

In an embodiment, the connecting portion comes with a plural quantity, and the connecting portions are slidably disposed along the lengthwise direction of the cross bar, and each of the connecting portions being selected independently from the group consisting of a hole, a penetrating hole, and a projection.

In an embodiment, the limit structure is penetrated through the penetrating hole of the cross bar and slidably installed therein.

In an embodiment, the bowed stringed instrument bowing exercise apparatus further comprises a sheath for sheathing the track rod, wherein the sheath is made of a flexible material such as leather, paper, cloth or flexible polymer.

In an embodiment, the track rod has a guide structure in the lengthwise direction, and the sheath has a contour corresponsive to the track rod.

In an embodiment, the track rod is a straight rod or a curved rod.

In an embodiment, the bowed stringed instrument bowing exercise apparatus further comprises a bowed stringed instrument, and the limit structure is installed at the bowed stringed instrument.

In an embodiment, the bowed stringed instrument is one selected from the family of a violin, a viola, a cello or a contrabass.

In an embodiment, the bowed stringed instrument is an exercise model made of paper or plastic.

In an embodiment, the bowed stringed instrument bowing exercise apparatus further comprises a clamping member for fixing the limit structure to the bowed stringed instrument.

In summation of the description above, the present invention has the following advantages and effects:

1. The present invention allows operators to learn how to bow the strings steadily by hands with an ideal bowing track during the practice of bowing the strings, and use this method in a performance to obtain ideal sounds. More specifically, a straight track rod is plugged onto a cross bar and a sheath is sheathed on the track rod in order to teach learners how to push and pull the sheath on an exercise track reciprocally and practice the hand feel during a straight bowing. In addition, the cross bar is rotated while pushing and pulling the sheath to achieve the effect of maintaining a non-deviated hand feel during the process of bowing the strings. The experience and memory of the straight hand motion obtained from practices may be transferred to an actual bowling performance to maximize the bowing effect.

2. While using the straight track rod without sheathing the sheath, a user can slidably install the track rod to the penetrating hole of the cross bar and hold the track rod like holding a bow to push and pull track rod reciprocally, while the cross bar is being rotated, so that the user experiences the hand feel of a straight bowing and changing the strings for a continuous performance.

3. The track rods are inserted onto different connection portions of the cross bar respectively, and the sheath on the track rod is pushed and pulled reciprocally, so that the user's hands can feel and compare the slight difference of distance between the front and the rear of the sheath pushed or pulled on the track rod, so as to obtain the control of bowing at any point between the fingerboard and the bridge, and achieve the skill and capability of adjusting the hand position at the front or the rear for different sound volumes and tones.

4. A curved track rod is plugged onto the cross bar, and the sheath sheathed on the curved track rod is pushed and pulled reciprocally in order to improve the coordination of hands and the flexibility required for bowing the strings of a bowed stringed instrument.

5. The present invention is based on the design for training a beginner's motion feeling and memory, and building a track rod to train the beginner's hand motion and allows the beginner to experience different bowing tracks, so as to train the beginner to play different tones, and improve the coordination and control required for bowing the strings of a bowed stringed instrument.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

The present invention provides a bowed stringed instrument bowing exercise apparatus, wherein the bowed stringed instrument is one selected from the family of a violin, a viola, a cello or a contrabass, and the bowed stringed instrument may be an exercise model made of paper or plastic.

Figure 1:
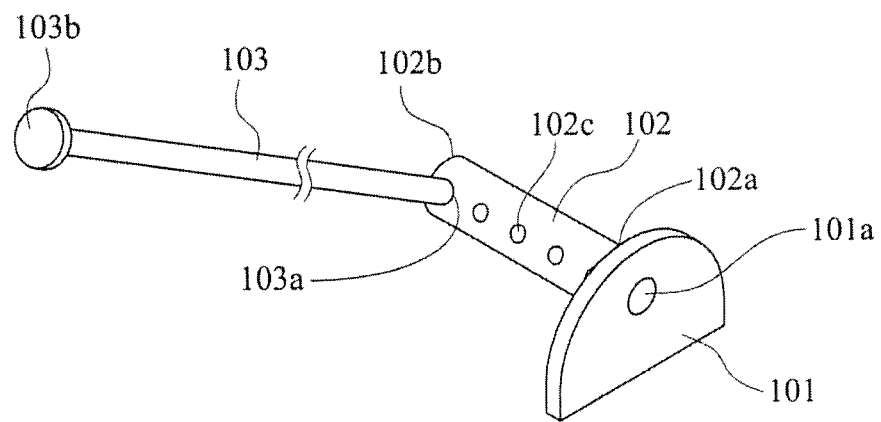
FIG. 1 is a schematic view of the present invention.

Referring to FIG. 1 for a schematic view of a bowed stringed instrument bowing exercise apparatus in accordance with a preferred embodiment of the present invention, the bowed stringed instrument bowing exercise apparatus 10 comprises a base 101, a cross bar 102 and a track rod 103. The base 101 includes a fixed wall, and the fixed wall includes a connecting portion 101a. The cross bar 102 includes a first end 102a and a second end 102b, and at least one connecting portion 102c disposed between the first end 102a and the second end 102b, wherein the connecting portion 102c is a limit structure. The cross bar 102 is installed to the connecting portion 101a through the first end 102a. The track rod 103 has an end portion 103a for connecting the connecting portion 102c, wherein the track rod 103 forms a bowing track.

Figure 2:
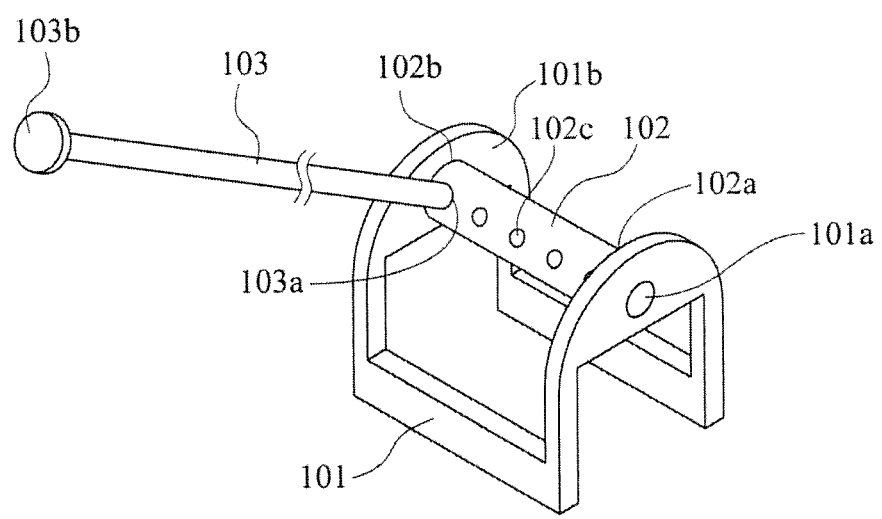
FIG. 2 is a schematic view of another preferred embodiment of the present invention.

In a preferred embodiment as shown in FIG. 2, the base 101 includes a first fixing wall and a second fixing wall disposed with an interval apart from each other and on the connecting portions 101a, 101b respectively, and provided for receiving the cross bar 102. However, the base 101 may be designed with different shapes such as the shapes of animals to attract the interest of children or operators. In addition, the applicable range of bowing strings to produce tones falls within the distance from a bridge to an end of a fingerboard, so that the distance between the connecting portions 101a, 101 or corresponding cross bars 102 is preferably matched with the distance from the bridge to the end of the fingerboard.

Figure 3:
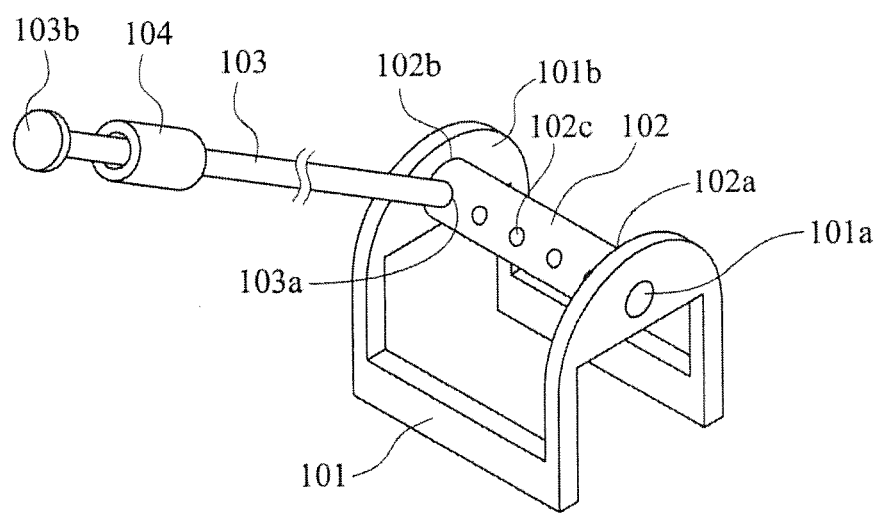
FIG. 3 is a schematic view of a bowed stringed instrument bowing exercise apparatus further including a sheath in accordance with the present invention.

In another preferred embodiment as shown in FIG. 3, the bowed stringed instrument bowing exercise apparatus 10 further comprises a sheath 104 for sheathing the track rod 103, wherein the sheath 104 is provided for a user to hold or grip, and the track rod 103 includes a guide structure in the lengthwise direction, so that the sheath may be fixed with respect to the position or angle of the track rod.

Figure 4A:
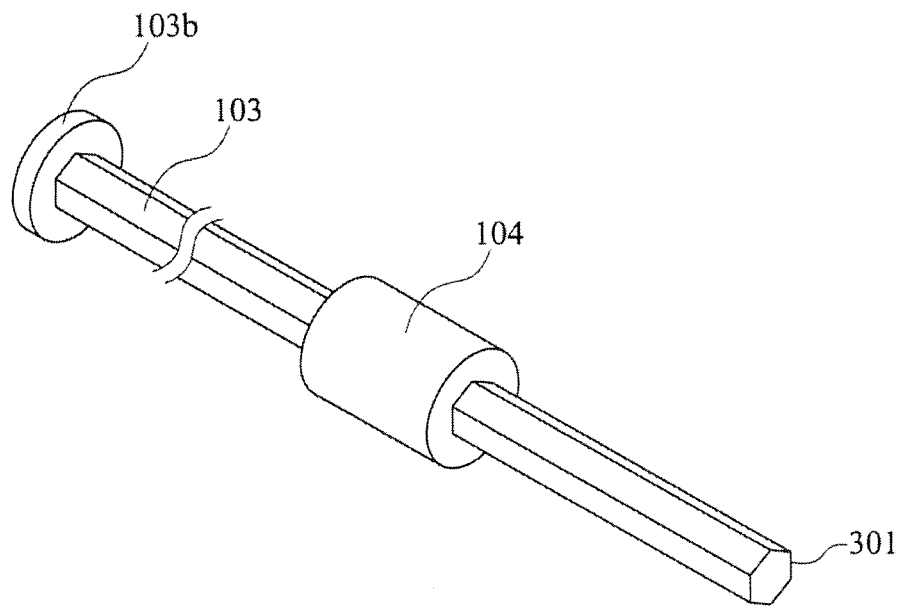
FIGS. 4A and 4B are schematic views showing a guide structure of a track rod in accordance with a preferred embodiment of the present invention.
Figure 4B:
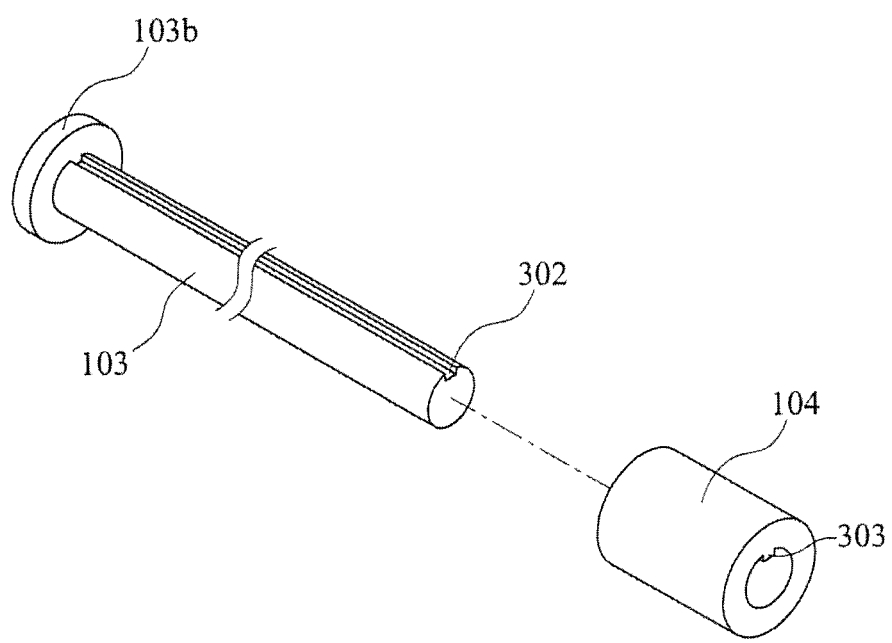

In the embodiment as shown in FIGS. 4A and 4B, the track rod has a guide structure in the lengthwise direction. However, this embodiment is not a restrictive embodiment.

In FIG. 4A, the track rod 103 is a polygonal rod, wherein a surface of the track rod 103 acts as the guide structure, and the sheath 104 has a contour corresponsive to the contour of the polygonal rod. For example, the track rod 103 is a hexagonal rod with six sides 301, such that when the sheath 104 slides back and forth along the track rod 103, the sheath 104 and the track rod 103 have the same surface angle, so that the sheath 104 will not be rotated arbitrarily.

In an embodiment, the guide structure is the track rod 103 having a guide slot 302, and the sheath 104 has a protrusion 303 corresponsive to the guide slot 302, wherein the shape of the guide slot 302 is limited by the following embodiment. In FIG. 4B, the protrusion 303 of the sheath 104 and the guide slot 302 of the track rod 103 are sheathed and coupled to each other, such that when the sheath 104 slides back and forth along the track of the guide slot 302 on the track rod 103, the sheath 104 will not be rotated arbitrarily.

In addition, the base 101 further comprises a positioning element. The positioning element may be any fixture installed on an actual bowed stringed instrument or a bowed stringed instrument model.

Figure 5A:
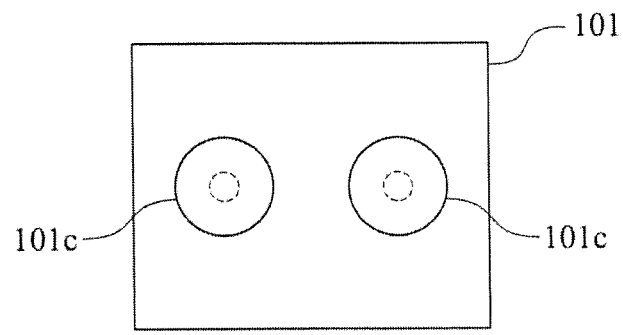
FIGS. 5A and 5B are schematic views showing different types of positioning elements.

For example, the positioning element 101c as shown in FIG. 5A may be a sucker installed at the bottom of the base 101.

Figure 5B:
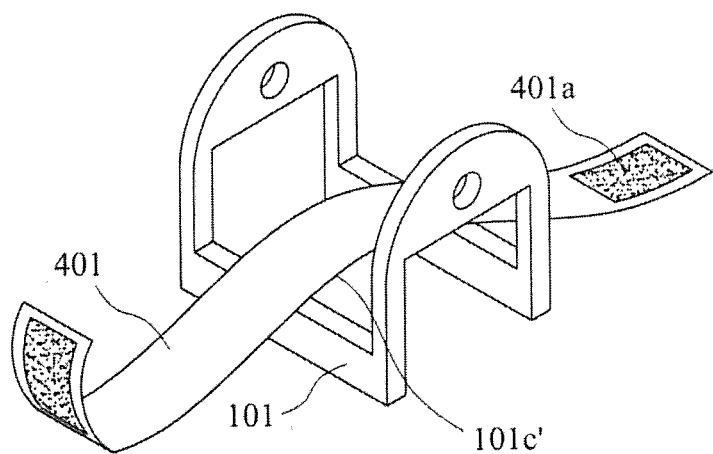

In FIG. 5B, if the base 101 is installed to an actual bowed stringed instrument, then the positioning element 101c' may be a binder 401 having a Velcro tape 401a. For example, a tape of the binder 401 may be fixed to the base 101.

Figure 5C:
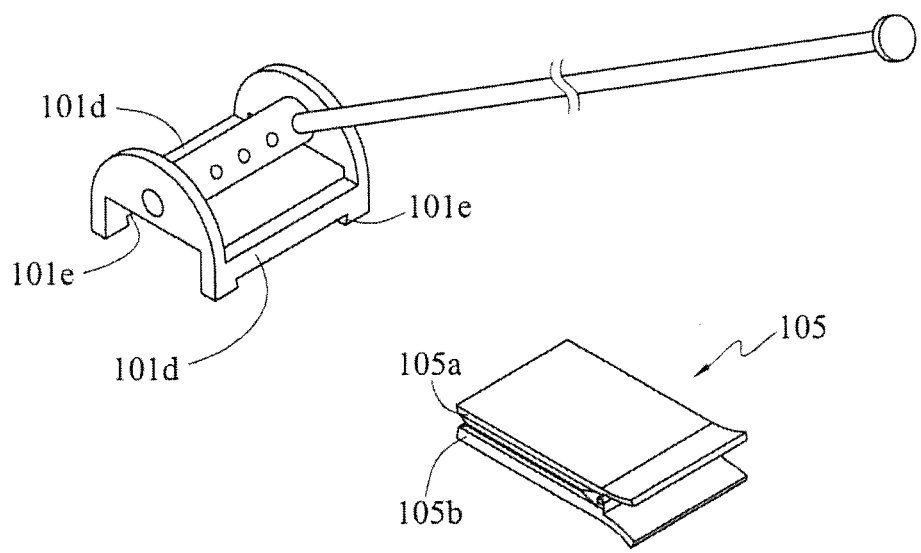
FIGS. 5C and 5D are schematic views showing a fixed base in accordance with another preferred embodiment of the present invention.

In another embodiment as shown in FIG. 5C, the base 101 may be fixed by other methods. For example, the bowed stringed instrument bowing exercise apparatus further comprises a clamping member 105 which may be a clip for clamping the base 101 to the strings directly. For example, the clamping member 105 is provided for bridging and clamping the bridging portion 101d of the connecting portion 101a, 101b onto the strings (wherein the clamping status is not shown in the figure).

Figure 5D:
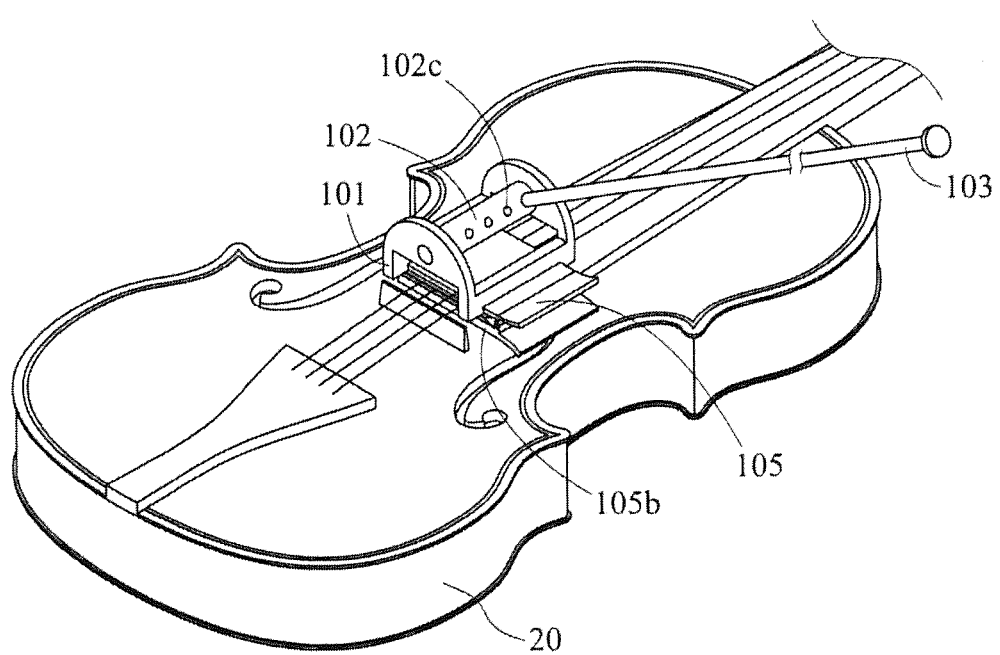

In another embodiment as shown in FIGS. 5C and 5D, the clamping member 105 has two clips 105a, 105b, and the base 101 has a latch portion 101e such as a dovetail tenon for latching the clip 105a of the clamping member 105, and both clips 105a, 105b are clamped onto the strings.

Figure 6:
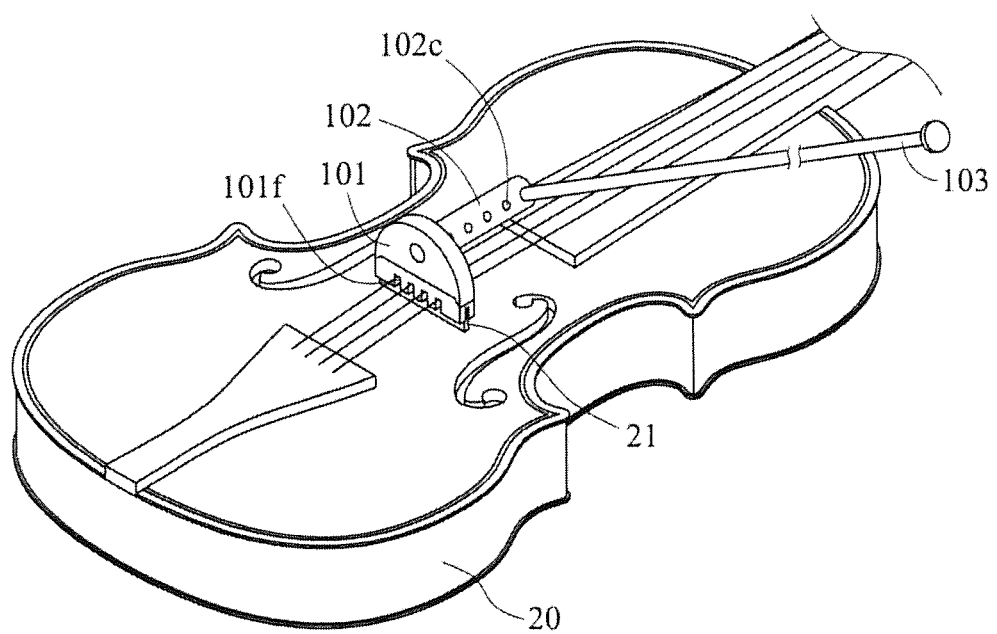
FIG. 6 is a schematic view of a base plugged into a bridge of a bowed stringed instrument.

In a preferred embodiment as shown in FIG. 6, the base 101 further comprises a plug slot 101f, and the bridge 21 the bowed stringed instrument 20 is plugged into the plug slot 101f.

In an embodiment, the plug slot 101f has the effect of reducing the sound volume.

It is noteworthy that the base of the present invention may come with different shapes. If the base is installed to an actual bowed stringed instrument, the base may be designed to be capable of passing through the strings. In other words, the base may be across the strings, and the connecting portion is slightly higher than the strings, so that the bowing status may be simulated.

In FIG. 2, the cross bar 102 has a first end 102a and a second end 102b disposed opposite to each other, and at least one connecting portion 102c disposed between the first end 102a and the second end 102b. More specifically, the cross bar 102 is a rectangular cylinder or a circular cylinder as shown in the figure, and the quantity of the connecting portions 102c is plural, and the connecting portions 102 are arranged along the lengthwise direction of the cross bar 102, so that a learner may practice the control of bowing at different positions between the fingerboard and the bridge and adjusting the hand position from the front or the rear. In the figure, the cross bar 102 is installed to the connecting portions 101a, 101b through the first end 102a and the second end 102b.

Figure 7:
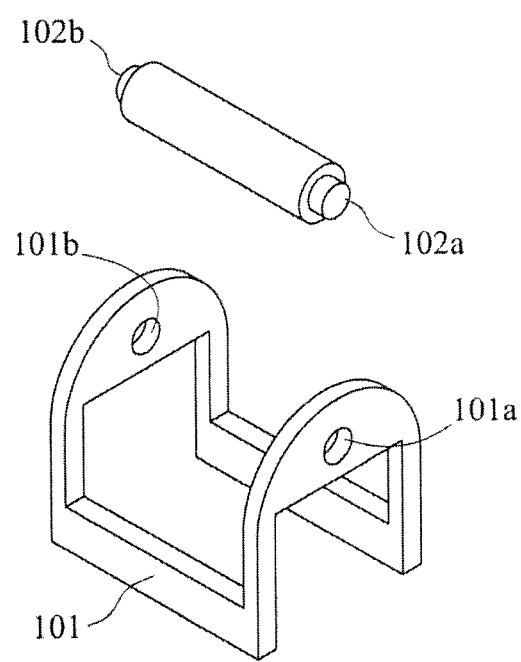
FIG. 7 is a schematic view of a cross bar pivotally coupled to a base.

In a preferred embodiment, the first end 102a and the second end 102b of the cross bar 102 are pivotally coupled and rotatably installed to the connecting portions 101a, 101b. For example, the connecting portions 101a, 101b are circular plug slots, and the first end 102a and the second end 102b of the cross bar 102 are corresponsive circular protruding pillar as shown in FIG. 7, such that the cross bar is rotatable after the connecting portions 101a, 101b and the cross bar 102 are assembled. Of course, the connecting portion 101a, 101b may be circular protruding pillars and the first end 102a and the second end 102b of the cross bar 102 may be circular plug slots. In addition, the cross bar 102 may be rotatably installed to the connecting portion 101a, 101b by a gear connection method.

Since the cross bar of the bowed stringed instrument bowing exercise apparatus may come with a rotatable design, therefore a user may bow the strings at an arbitrary angle easily, and experience the motion of bowing the strings at different bowing positions.

The cross bar 102 may be connected by another a latching method such as a dovetail tenon latch, screw connection or magnetic attraction, wherein the magnetic attraction method is achieved by installing magnets to the connecting portion 101a, 101b or the cross bar 102.

In FIG. 2, the track rod 103 has an end portion 103a provided for connecting the connecting portion 102c, a stop portion 103b disposed at the other end of the track rod 103. In FIG. 3, the sheath 104 is sheathed on the track rod 103, and the sheath 104 is pushed and pulled reciprocally to simulate a straight bowing motion and teach an operator with regard to the hand feel of a straight bowing motion. Since the cross bar 102 is rotatably installed to the connecting portions 101a, 101b, the cross bar 102 allows the operator to change the position of bowing the string continuously without any deviated angle in a performance.

Figure 8A:
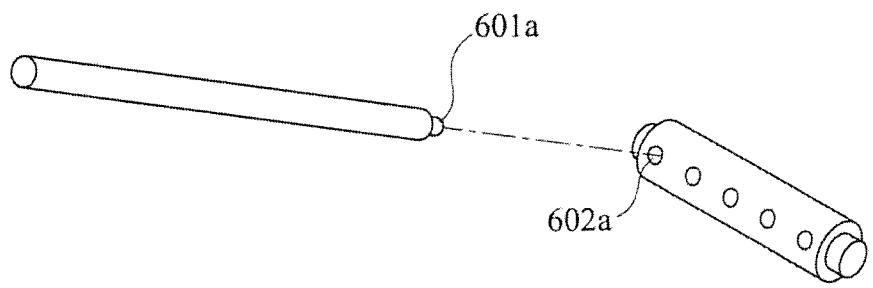
FIGS. 8A and 8B are schematic views showing the way of installing a track rod and a cross bar.

In an embodiment as shown in FIG. 8A, the end portion of the track rod is a projection 601a, and the connecting portion is a hole 602a, and the projection 601a is plugged into the hole 602a.

Figure 8B:
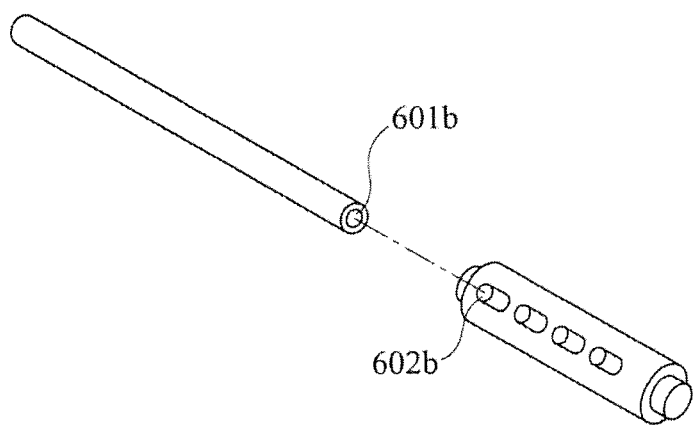

In FIG. 8B, the connecting portion is a projection 602b, and the end portion of the track rod is a hole 601b, and the projection 602b is plugged into the hole 601b.

Figure 9:
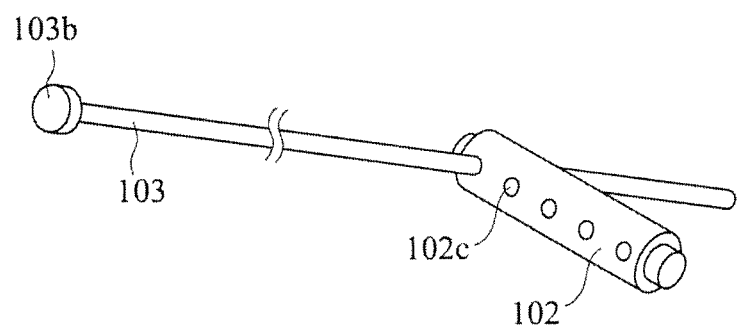
FIG. 9 is a schematic view of a track rod penetrating through a cross bar.

In an embodiment without the sheath as shown in FIG. 9, the connecting portion 102c is penetrated through the penetrating hole of the cross bar 102, and provided for the track rod 103 to be slidably installed therein, so that a user may hold and slide the track rod 103 back and forth to experience the bowing motion.

In another preferred embodiment, the connecting portion comes with a plural quantity and the connecting portions are installed along the lengthwise direction of the cross bar as shown in FIGS. 8A, 8B and 9, wherein each of the connecting portions is a hole 602a, a projection 602b or a penetrating hole penetrating the cross bar 102.

Figure 10:
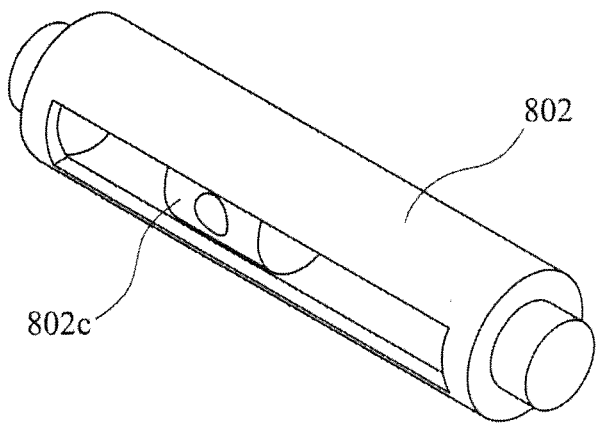
FIG. 10 is a schematic view of a connecting portion which is a slide slot.

In FIG. 10, the connecting portion of the cross bar 802 is a slide slot 802c slidably installed along the lengthwise direction of the cross bar 802 and on the cross bar 802, so that an operator's hand may feel the slight difference of the front and rear distances whole bowing the strings by hand, so as to control bowing the string at any point between the fingerboard and the bridge, and improve the skill and capability of adjusting the front and rear position of the hand to play different sound volumes and tones.

Figure 11:
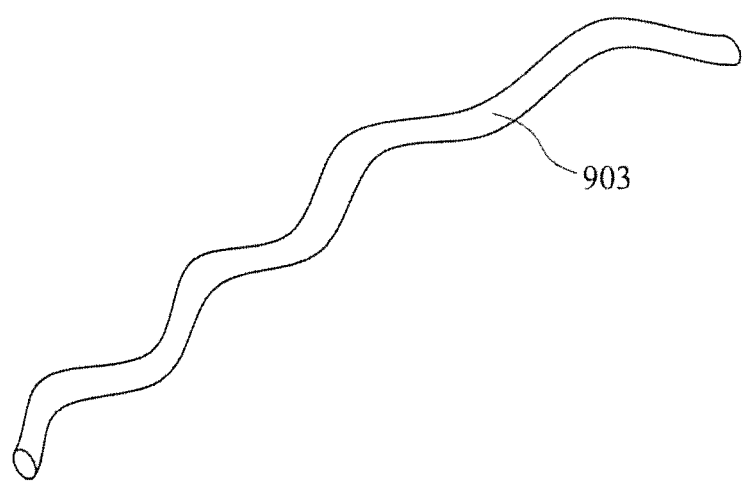
FIG. 11 is a schematic view of a track rod which is a curved rod.

In addition, the track rod may be a straight rod as shown in FIG. 1 or a curved rod 903 as shown in FIG. 11, wherein the curved rod 903 may have a single-wave or multi-wave shape, so that the operator can gain the experience and control of bowing in a track of a specific shape and improve the flexibility and coordination of the hand.

Figure 12:
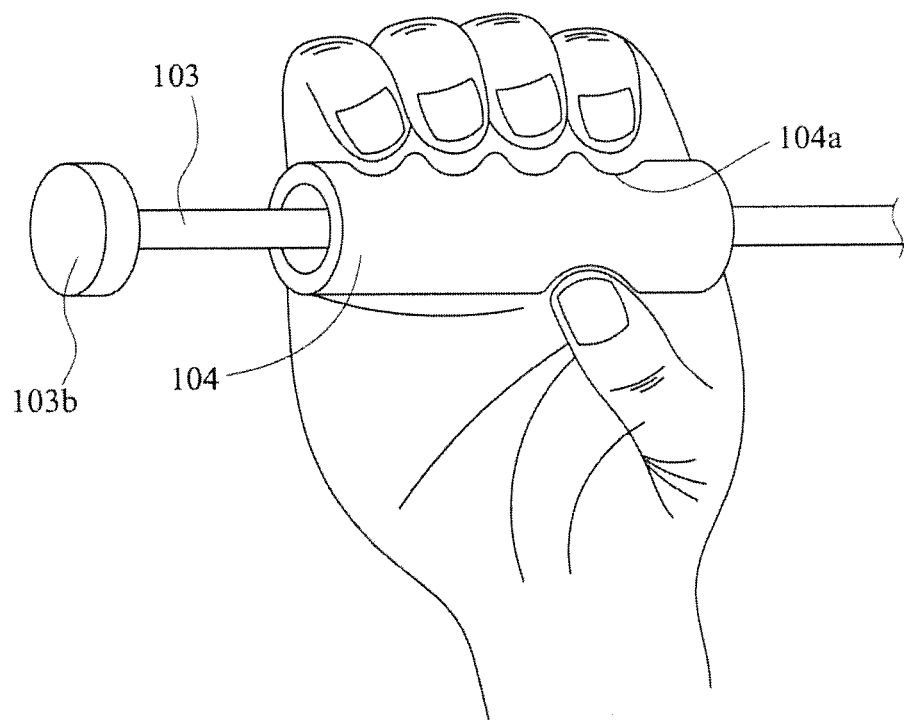
FIG. 12 is a schematic view of a sheath with a handholding portion.

In FIG. 12, the sheath 104 has a handheld portion 104a. In addition, the sheath 104 of the present invention is made of a flexible material such as leather, paper, cloth or flexible polymer.

In an embodiment, the flexible material includes genuine leather, artificial leather, paper, unwoven cloth or fluffy cloth.

In another embodiment, the flexible polymer is silicone or foam.

Referring to FIG. 5D for another implementation mode of the present invention applied for teaching, the bowed stringed instrument bowing exercise apparatus is mounted onto a bowed stringed instrument, and a user may connect the track rod 103 to the connecting portion 102c and operate the track rod 103, and set the cross bar 102 at an arbitrary angle to simulate different angles of bowing the strings. However, the way of fixing the base 101 is not limited to that as shown in the figure, and the bowed stringed instrument bowing exercise apparatus of the invention is not limited to that as shown in the figure.

In another preferred embodiment, a sheath 104 is sheathed on the track rod 103, so that when a user push or pull the sheath 104 reciprocally, the user can learn the required stable and flexible hand motions and memorize the hand conditions and tracks, and may further transfer and apply the learned skills in an actual performance, so as to achieve the correct bowling posture and ideal sound.

With reference to FIG. 9 for a bowing learning method in accordance with a further preferred embodiment of the present invention, the connecting portion 102c is penetrated through the penetrating hole of the cross bar 102 and provided for slidably installing the track rod 103 therein, and allowing the user to push and pull the track rod 103 reciprocally, and rotate and maintain the cross bar 102 to an arbitrary angle, so as to simulate the angle of bowing the strings and allow the user to learn the correct bowing posture.

In a preferred embodiment as shown in FIG. 1, the connecting portion 102c comes with a plural quantity, and the connecting portions 102c are installed along the lengthwise direction of the cross bar 102. In FIGS. 8A, 8B and 9, each connecting portion is a hole 602a, a projection 602b or a penetrating hole penetrated through the cross bar 102. In other words, the cross bar 102 may concurrently has the hole 602a, the projection 602b and/or the penetrating hole, and the procedure of operating the track rod 103 includes the step of connecting the track rod 103 to a connecting portion 102c at a different position for the practice. Therefore, the user can have a good hand feel and compare the difference of pushing/pulling the sheath on the track rod within a slight difference of the front and rear positions, so as to control bowing at any point between the fingerboard and the bridge, and improve the skill and capability of adjusting the front and rear position of the hand to play different sound volumes and tones.

Figure 13:
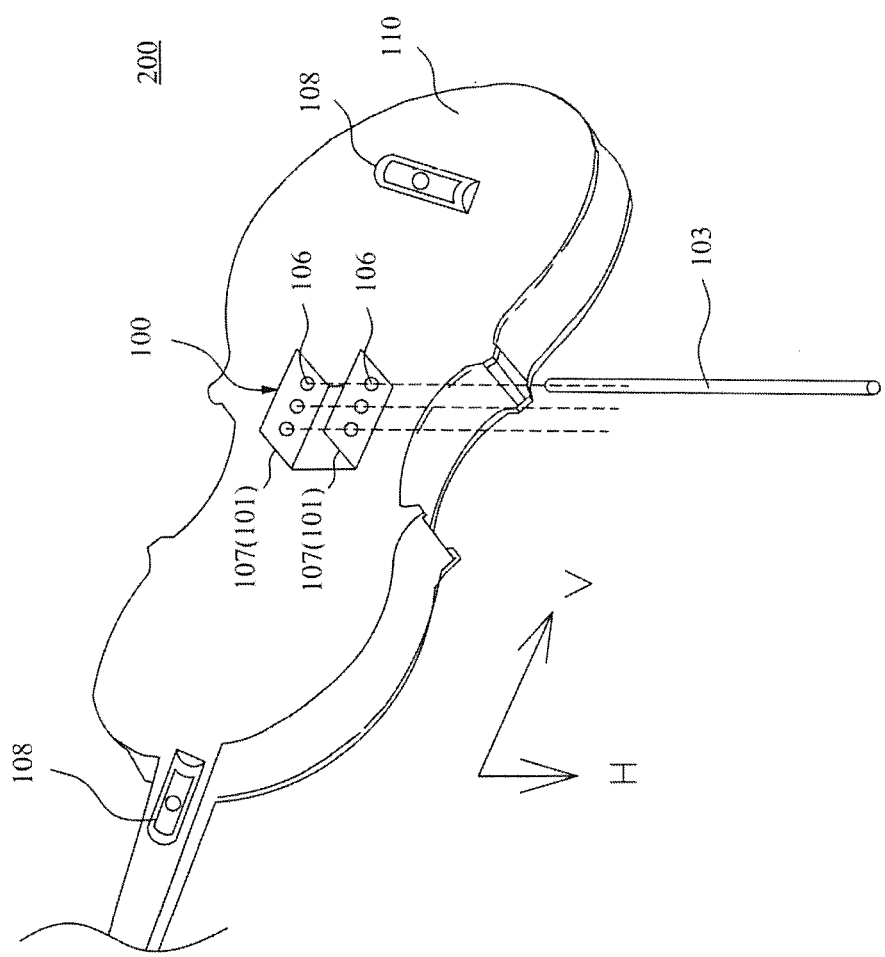
FIG. 13 is a perspective view of a bowed stringed instrument exercise apparatus in accordance with a preferred embodiment of the present invention.

Referring to FIG. 13 for a perspective view of a bowed stringed instrument exercise apparatus in accordance with a preferred embodiment of the present invention, the bowed stringed instrument exercise apparatus 200 comprises a bowed stringed instrument 110, a bowed stringed instrument bowing exercise apparatus 100 and a track rod 103, wherein the bowed stringed instrument of this embodiment is an exercise model made of paper or plastic, and the bowed stringed instrument bowing exercise apparatus 100 is mounted onto the bowed stringed instrument 110 and includes a plurality of limit structures 106. The track rod 103 is connected to at least one of the limit structures 106. The track rod 103 is limited by the limit structure 106 and prevented from moving sideway, so that it can move in a direction guided by the limit structure 106. In other words, the track rod 103 cannot be moved in an extending direction V towards the bowed stringed instrument 110, and it can only be moved in a lateral direction H of the bowed stringed instrument 110. If it is necessary to change the track rod 103 to a position of the extending direction V of the bowed stringed instrument 110, the user just needs to separate the track rod 103 from the original limit structure 106 and switch to another limit structure 106.

Since the track rod 103 cannot be moved towards the extending direction V of the bowed stringed instrument 110 but it can only be moved in the lateral direction of the bowed stringed instrument 110, therefore the user can improve the capable of bowing the strings steadily by hand. In addition, the user can change the position of the track rod 103 in the extending direction V of the bowed stringed instrument 110, so that the user can improve the capability of bowing the strings steadily by hand after changing the position to continue the performance.

Specifically, the bowed stringed instrument bowing exercise apparatus 100 and the track rod 103 of an embodiment are described below. It is noteworthy that the structure of the bowed stringed instrument bowing exercise apparatus 100 and the track rod 103 of the present invention are not limited to the following embodiment only, but any persons having ordinary skill in the art may make modifications and changes without departing from the spirit of the invention.

In FIG. 13, the bowed stringed instrument bowing exercise apparatus 100 further comprises a base 101. In an embodiment, the base 101 comprises a first fixing wall 107 and a second fixing wall 107, and the fixed walls 107 have an extending direction which is the same as the extending direction V of the bowed stringed instrument 110. Each fixed wall 107 has a corresponsive limit structure 106, and the limit structure 106 may be an opening. The first fixing wall 107 and the second fixing wall 107 have a predetermined distance apart from each other, so that when the track rod 103 is plugged into the first fixing wall 107 and the second fixing wall 107, the track rod 103 cannot be moved towards the extending direction V of the bowed stringed instrument 110, but it can only be moved in the lateral direction of the bowed stringed instrument 110. In an embodiment, only one fixed wall is provided, and the thickness of the fixed wall is limited to an extent that just allows the track rod 103 to move within the limit structure 106 (which is an opening) only.

In an embodiment as shown in FIG. 13, the limit structure 106 is in a circular shape. In other embodiments, the limit structure 106 may be in a U-shape or any other shape.

Figure 14:
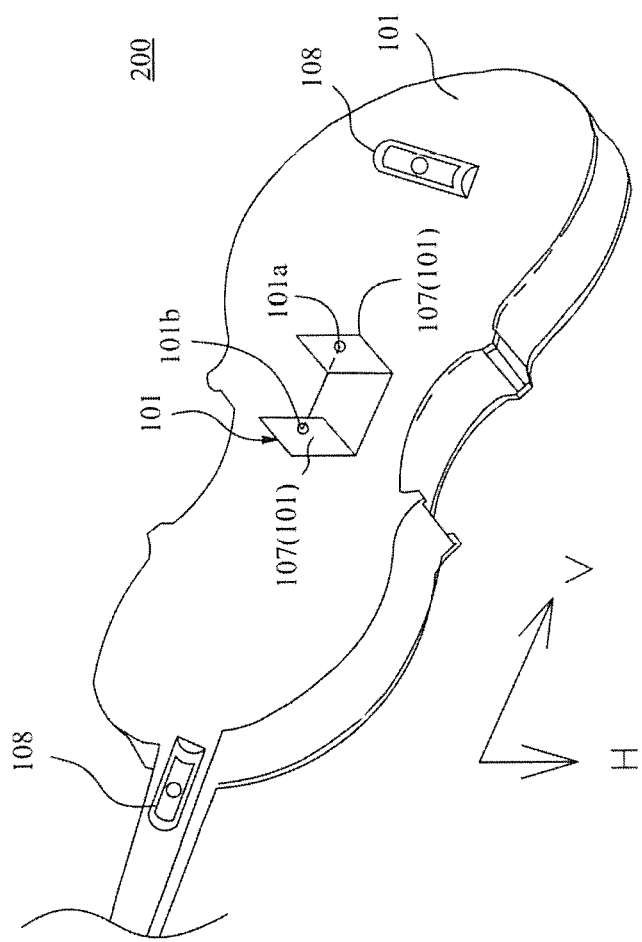
FIG. 14 is a perspective view of a bowed stringed instrument exercise apparatus in accordance with another preferred embodiment of the present invention.

With reference to FIG. 14 for a perspective view of a bowed stringed instrument exercise apparatus in accordance with another preferred embodiment of the present invention, the base 101 comprises a first fixing wall 107 and a second fixing wall 107, and the fixed walls 107 have an extending direction perpendicular to the extending direction V of the bowed stringed instrument 110. The fixed wall 107 has a connecting portion 101a, 101b for receiving the cross bar 102, so that the extending direction of the cross bar 102 is the same as the extending direction V of the bowed stringed instrument 110. The cross bar 102 is coupled to the first fixing wall 107 and the second fixing wall 107 by a pivotal connection, a screw connection or a magnetic attraction, and the way of connecting the cross bar 102 is the same as those as shown in FIGS. 1 and 2, and thus it will not be repeated.

In an embodiment, the bowed stringed instrument bowing exercise apparatus 100 further comprises at least one level meter 108 installed to the bowed stringed instrument 110 for indicating a horizontal status. In an embodiment, the level meter 108 is in the shape of a strip, and the long-axis direction of the level meter 108 is extended along the extending direction V of the bowed stringed instrument 110 and preferably installed at the neck of a bowed stringed instrument. In an embodiment, two level meters 108 may be used, wherein one of the level meters 108 has a long-axis direction extended along the extending direction V of the bowed stringed instrument 110 and the other level meter 108 has a long-axis direction extended along the lateral direction H of the bowed stringed instrument 110. Therefore, the horizontal status in both extending direction V and lateral direction H can be shown. In an embodiment, the level meter 108 may also be in a circular shape with a circular indicating sign disposed at the center for showing the horizontal status in different directions (including the extending direction V and the lateral direction H).

In summation of the description above, the present invention provides a bowed stringed instrument bowing exercise apparatus mounted at a bowing position of a bowed stringed instrument, so that an operator may use a track rod to imagine an ideal bowing track to push and pull the track rod, or push and pull the sheath of the track rod reciprocally, so as to learn the stability and flexibility of the hand required for playing the bowed stringed instrument and memorize the hand condition and track, and further transfer and apply the learned skill and motion to an actual performance, and obtain a correct bowing posture and an ideal sound.

While we have shown and described the embodiment in accordance with the present invention, it should be clear to those skilled in the art that further embodiments may be made without departing from the scope of the present invention.

What is claimed is:

1. A bowed stringed instrument bowing exercise apparatus, comprising:
    at least one limit structure;
    a track rod, with an end installed to the at least one limit structure, such that the track rod forms a bowing track;
    a base, having at least one first connecting portion; and
    a cross bar, having a first end and a second end disposed opposite to each other, and at least one second connecting portion disposed between the first end and the second end, and the cross bar is installed to the first connection portion through the first end, whereby the second connecting portion defines the limit structure.

2. The bowed stringed instrument bowing exercise apparatus as claimed in claim 1, further comprising a first fixing wall and a second fixing wall, and the limit structure is formed on the first fixing wall and the second fixing wall.

3. The bowed stringed instrument bowing exercise apparatus as claimed in claim 1, wherein the cross bar is coupled to the first fixing wall and the second fixing wall through a pivotal connection, a screw connection, or a magnetic suction, so that the limit structure is rotated to and positioned at an arbitrary angle.

4. The bowed stringed instrument bowing exercise apparatus as claimed in claim 1, wherein the base further includes a first fixing wall and a second fixing wall, and two first connecting portions are respectively disposed on the first fixing wall and the second fixing wall.

5. The bowed stringed instrument bowing exercise apparatus as claimed in claim 1, wherein the base further includes a positioning element or a plug slot.

6. The bowed stringed instrument bowing exercise apparatus as claimed in claim 5, wherein the positioning element is a sucker or a binder with a hook and loop fastening tape.

7. The bowed stringed instrument bowing exercise apparatus as claimed in claim 1, wherein the first end and the second end of the cross bar are coupled to a pair of first connecting portions through a pivotal connection, a screw connection or a magnetic suction, so that the second connecting portion is rotated to and position at an arbitrary angle.

8. The bowed stringed instrument bowing exercise apparatus as claimed in claim 1, wherein the second connecting portion is installed within a slide slot formed along the lengthwise direction of the cross bar.

9. The bowed stringed instrument bowing exercise apparatus as claimed in claim 1, wherein the second connecting portion comes with a plural quantity, and the second connecting portions are slidably disposed along the lengthwise direction of the cross bar, and each of the second connecting portions being selected independently from the group consisting of a hole, a penetrating hole, and a projection.

10. The bowed stringed instrument bowing exercise apparatus as claimed in claim 1, wherein the limit structure is penetrated through a penetrating hole of the cross bar and the track rod is slidably installed therein.

11. The bowed stringed instrument bowing exercise apparatus as claimed in claim 1, wherein the track rod is a straight rod or a curved rod.

12. The bowed stringed instrument bowing exercise apparatus as claimed in claim 1, further comprising a bowed stringed instrument, and the limit structure being installed at the bowed stringed instrument.

13. The bowed stringed instrument bowing exercise apparatus as claimed in claim 12, wherein the bowed stringed instrument is a violin, a viola, a cello or a contrabass.

14. The bowed stringed instrument bowing exercise apparatus as claimed in claim 12, wherein the bowed stringed instrument is an exercise model made of paper or plastic.

15. The bowed stringed instrument bowing exercise apparatus as claimed in claim 12, further comprising a clamping member for fixing the limit structure to the bowed stringed instrument.

16. A bowed stringed instrument bowing exercise apparatus, comprising:
    at least one limit structure; and
    a track rod, with an end installed to the at least one limit structure, such that the track rod forms a bowing track;
    wherein the limit structure is a hole, and the end portion of the track rod is a projection provided for plugging into the hole; or the limit structure is a projection, and the end portion of the track rod is a hole provided for plugging the projection therein.

17. A bowed stringed instrument bowing exercise apparatus, comprising:
    at least one limit structure;
    a track rod, with an end installed to the at least one limit structure, such that the track rod forms a bowing track; and
    a sheath for sheathing the track rod;

wherein the track rod has a guide structure in the lengthwise direction, and the sheath has a contour corresponsive to the track rod.

\* \* \* \* \*